United States Patent [19]
Kim

[11] Patent Number: 5,910,957
[45] Date of Patent: Jun. 8, 1999

[54] TEST DEVICE AND ITS METHOD FOR TESTING DSP ICS IN THE FINISHED PRODUCT STATE IN A DIGITAL VIDEO APPARATUS

[75] Inventor: Byoung-Jin Kim, Suwon, Rep. of Korea

[73] Assignee: Samsung Eectronics Co., Ltd., Kyungki-Do, Rep. of Korea

[21] Appl. No.: 08/866,316

[22] Filed: May 30, 1997

[30] Foreign Application Priority Data

Oct. 31, 1996 [KR] Rep. of Korea ............ 51157/1996

[51] Int. Cl.⁶ ...................................... G06F 11/00
[52] U.S. Cl. ............................................... 371/21.1
[58] Field of Search ........................ 371/21.1, 22.1, 371/22.2, 22.5, 22.6, 25.11, 26

[56] References Cited

U.S. PATENT DOCUMENTS 5,726,996  3/1998  Chakradhar et al. ............... 371/27

*Primary Examiner*—Vincent P. Canney
*Attorney, Agent, or Firm*—Sughrue, Mion, Zinn, Macpeak & Seas, PLLC

[57] ABSTRACT

A test device for testing a plurality of Digital Signal Processor Integrated Circuits Incorporated as a finished product in a digital video apparatus comprises: a plurality of Digital Signal Processor Integrated Circuits (DSP ICs) for processing a signal from a test signal generator as a digital signal and outputting the digitally processed signal, the test signal generator being disposed at an input end of the plurality of DSP ICs; a monitor for monitoring an output from the DSP IC being tested. It is possible to check in a simple manner the operating state of each IC connected to other DSP ICs as well as the production and assembly state of the PCB as a finished digital video apparatus. Furthermore, it is possible to check for damage of the parts or an error which may be generated during connection of the ICs to the lines on the PCB in the manufacturing of the products as well as defects caused during shipping of assembled IC components in a DSP apparatus.

11 Claims, 4 Drawing Sheets

(a) A VERTICAL SWEEP SIGNAL (b) A VERTICAL SWEEP SIGNAL VIEWED FROM A HORIZONTAL DIRECTION

TEST DEVICE AND ITS METHOD FOR TESTING DSP ICS IN THE FINISHED PRODUCT STATE IN A DIGITAL VIDEO APPARATUS

BACKGROUND OF THE INVENTION

1. Field of the Invention

The present invention relates to a test device and method for checking whether Digital Signal Processor Integrated Circuits (DSP ICs) and a Printed Circuit Board (PCB) containing the ICs contain a fault in the assembled PCB product.

2. Description of the Related Art

In general, many ICs for DSP have been assembled compositely on a PCB in a digital video apparatus for use in processing digital signals. Such ICs are subject to testing to determine whether they are faulty using a specific IC test equipment before the ICs are assembled on the PCB. The test to determine whether the IC is defective has usually been made by checking only a single IC prior to its integration with other ICs.

The conventional IC test equipment can be classified as a signal generator portion and a signal analyzer portion. The signal generator is designed to output a signal suitable to test each IC property in order to check both whether the fabricated IC is bad and whether an error occurred in the design and development stage. The signal analyzer is designed to analyze a result when a test signal generated from the signal generator is input to the IC to be tested.

However, this known type of IC test equipment requires separate preparation for each IC and can only be used to check a single IC prior to its integration with other components. Therefore, in the assembled state of PCB on which various ICs are mounted in a complicated manner, it is impossible to test for a fault in an IC by using the conventional IC test equipment. The testing of assembled ICs is important because the component parts may suffer damage or an error may be generated when connecting ICs on the PCB during manufacturing or a defect may occur when depositing and transporting products containing the ICs. However, prior to this invention, there was no method of checking for IC damage in the assembled DSP products.

SUMMARY OF THE INVENTION

It is therefore an object of the present invention to provide a test device and a method which can check the operating state of each of IC while connected to other ICs as well as the production and assembly state of the PCB when the manufacturing of products is finished.

It is a further object of the present invention to provide a test device and method which can check for damage of the parts which occurred as the ICs were connected to the PCB during manufacturing or during shipping of the finished product.

The foregoing and the other objects of the present invention have been attained by providing a test device for testing a plurality of Digital Signal Processor Integrated Circuits in a finished product state. The device comprises one or more Digital Signal Processor Integrated Circuits (DSP ICs) for processing a test signal from a test signal generator as a digital signal and outputting the digitally processed signal, the test signal generator being disposed at a front end of the DSP IC; and a monitor for monitoring an output from the DSP IC being tested.

BRIEF DESCRIPTION OF THE DRAWINGS

A more complete appreciation of this invention, and many of the attendant advantages thereof, will be readily apparent as a preferred embodiment of the invention is described with reference to the accompanying drawings, in which like reference symbols indicate the same or similar elements components, wherein.

DETAILED DESCRIPTION OF THE PREFERRED EMBODIMENT(S)

Now, a preferred embodiment of the present invention will be described in detail with reference to the accompanying drawings. In the following description, numerous specific details such as the circuit components and specific numeric expressions are set forth to provide a more comprehensive description of the present invention. It will be apparent to one skilled in the art that the invention may be practiced without using the specific details but substituting appropriate modifications. Detailed descriptions of well-known components and their construction are omitted to avoid obscuring the subject matter of the present invention.

A test device and a method are provided which can simply check the operating state of each IC while connected to various other DSP ICs. The test device and method can also be used to verify the production and assembly state of a PCB as a finished product. The invention will be described with reference to FIG. 1.

Figure 1:
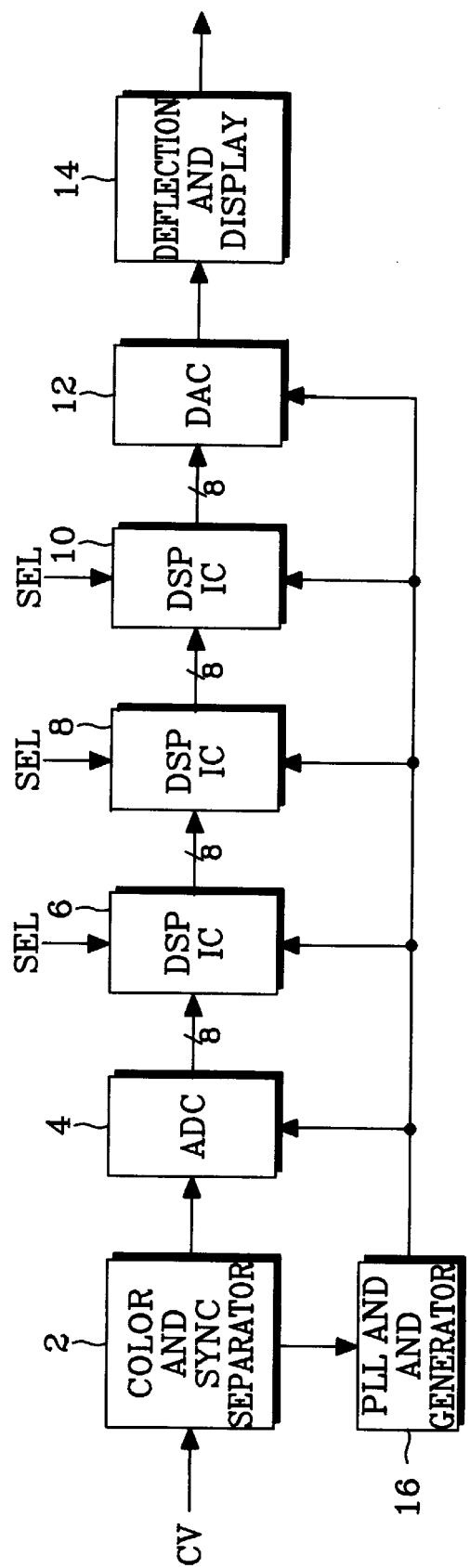
FIG. 1 is a block diagram showing the construction of a digital video apparatus having a plurality of DSP ICs, including an Analog to Digital Converter (ADC) and a Digital to Analog Converter (DAC) used in a preferred embodiment of the present invention.

FIG. 1 illustrates the construction of a digital video apparatus having a plurality of DSP ICs 6,8,10, an Analog to Digital Converter (hereinbelow, referred to as ADC) 4 and a Digital to Analog Converter (hereinbelow, referred to as DAC) 12 used for an embodiment of the present invention.

It is assumed that each of the circuit elements of FIG. 1 was assembled to a PCB.

Referring to FIG. 1, a Composite Video Signal CV is separated into a chrominance signal and a synchronizing signal in a color and sync separator 2 and the separated signals are converted to a digital signal in ADC 4, and a digital signal process according to the intrinsic operation of the DSP ICs is carried out in the series of DSP ICs 6,8,10 connected at the output end of ADC 4. The digitally processed signal is re-converted to an analog signal in DAC 12 so that the analog processed signal is deflected and displayed in a deflection and display 14. A Phase Locked Loop (PLL) and clock generator 16 phase-locks a signal received from the color and sync separator 2, generates various clocks and supplies corresponding clock signals to ADC 4, DSP ICs 6,8,10, and DAC 12, respectively.

Figure 2:
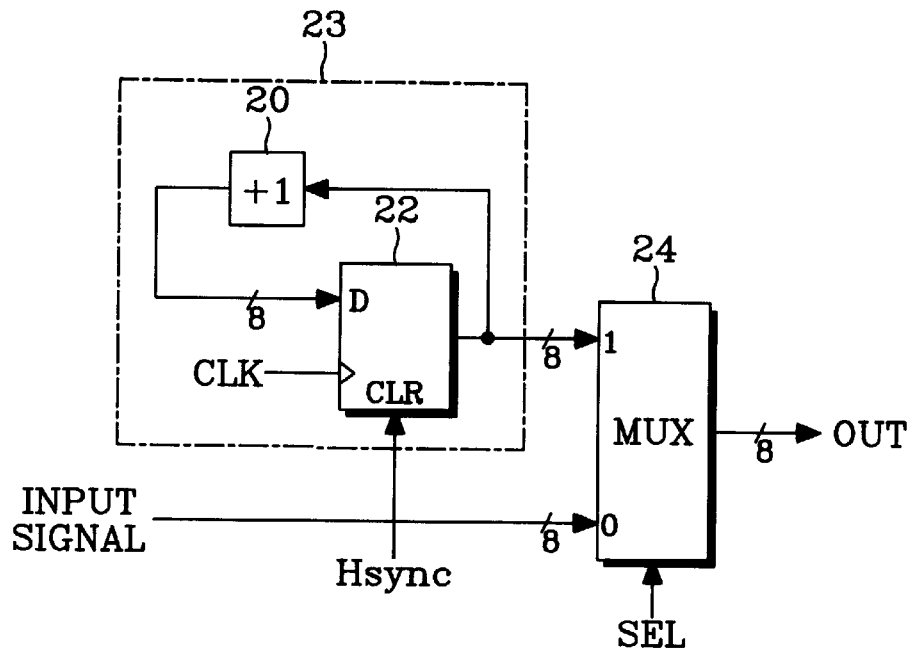
FIG. 2 is a circuit diagram showing a horizontal sweep pattern generating circuit included or embedded in DSP ICs according to an embodiment of the present invention.
Figure 3:
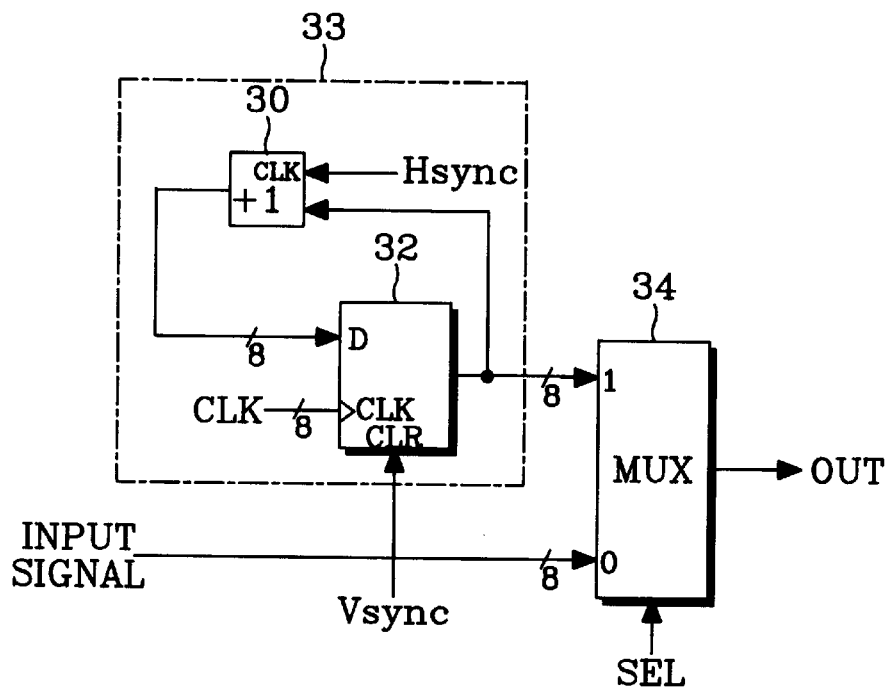
FIG. 3 is a circuit diagram showing a vertical sweep pattern generating circuit included or embedded in DSP ICs according to an embodiment of the present invention.

Each of the plurality of DSP ICs 6,8,10 is provided with a horizontal and a vertical sweep signal generating circuit, respectively shown in FIG. 2 and FIG. 3 for use in checking in a simple manner the operating state of each of the ICs while it is connected with other DSP ICs. The sweep generating circuits are also used to check the production state and assembly state of the PCB when the manufactured product is finished.

FIG. 2 is a circuit diagram showing a horizontal sweep signal generator embedded in each DSP IC 6,8,10 in FIG. 1 and FIG. 3 is a circuit diagram showing a vertical sweep signal generator embedded in each DSP IC 6,8,10. The horizontal sweep signal generator and the vertical sweep signal generator are disposed at an input end within each of the DSP ICs 6,8,10.

Figure 4:
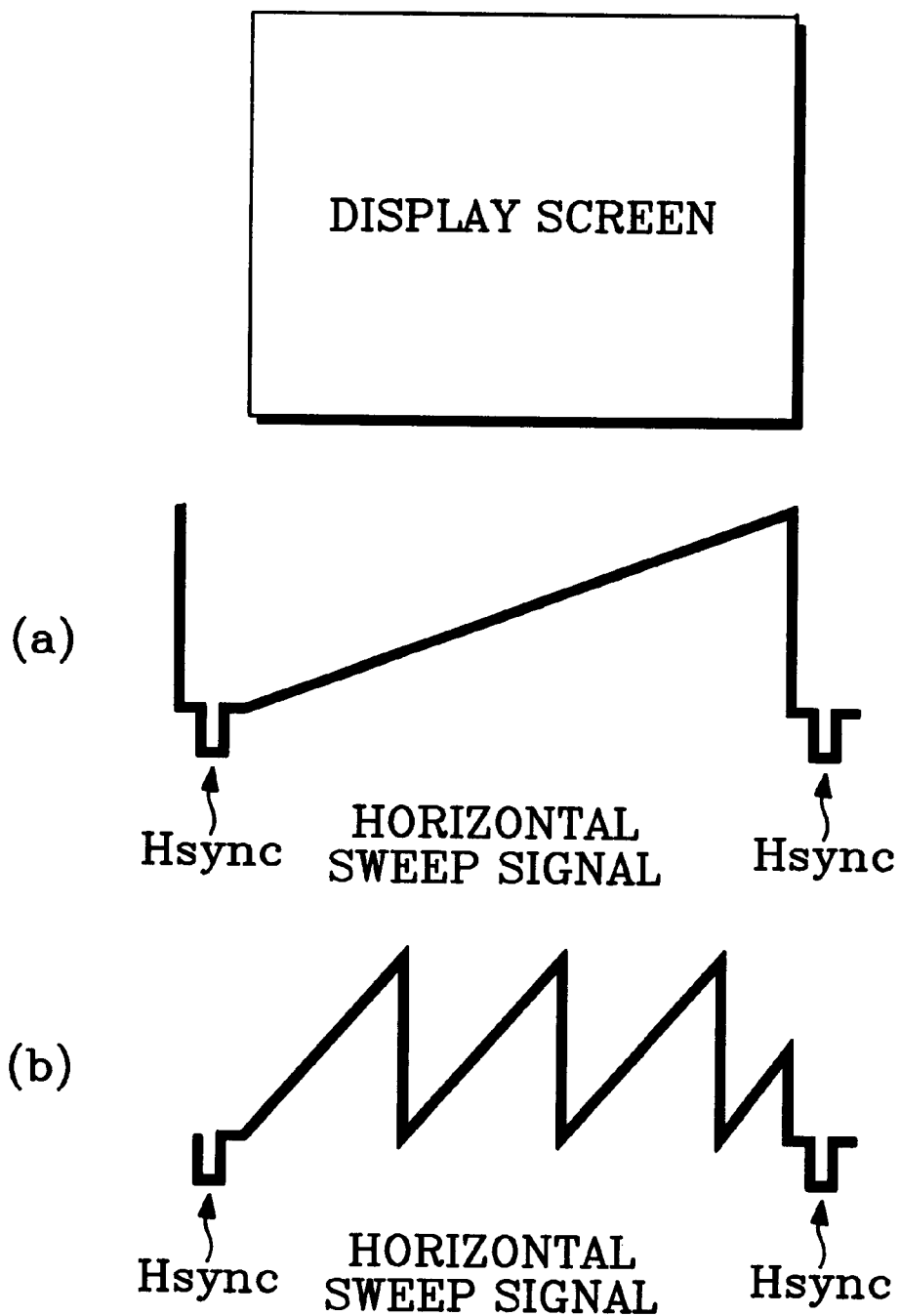
FIG. 4 is a wave form chart showing a horizontal sweep pattern from the horizontal sweep pattern generating circuit according to an embodiment of the present invention.
Figure 5:
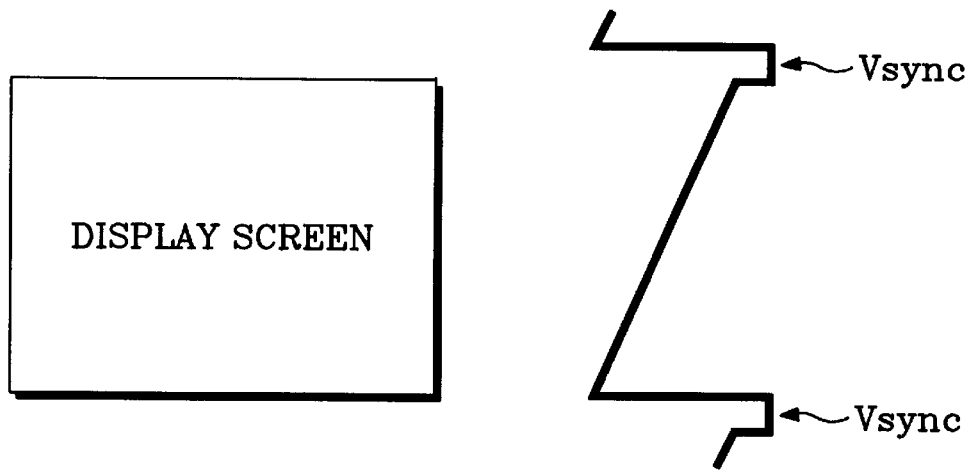
FIG. 5 is a wave form chart showing a vertical sweep pattern from the vertical sweep pattern generating circuit according to an embodiment of the present invention.
Figure 5:
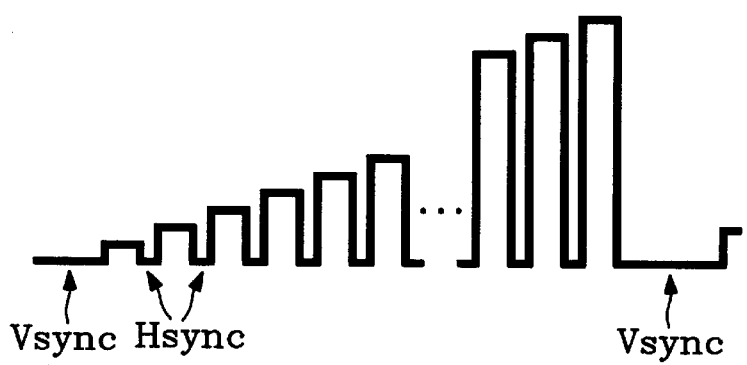

FIG. 4 shows a wave form chart of a horizontal sweep signal generated from the horizontal sweep signal generating circuit in FIG. 2, and FIG. 5 shows a wave form chart of a vertical sweep signal generated from the vertical sweep signal generating circuit in FIG. 3. When the broadcast for a television ends, the television displays continuously on its screen an image in which all levels from the black level pixel to the white level pixel are represented. At this time, the source is a very [insert missing terminology?] sweep signal. The reason why a horizontal and a vertical sweep signal generating circuit are included in the DSP ICs is because they generate horizontal and vertical sweep signals covering all levels from the black level pixel to the white level pixel. This is the optimum signal in determining whether the circuitry operates normally and whether the PCB is defective.

Referring to FIG. 3, the horizontal sweep signal generator disposed at an input end within each of the plurality of DSP ICs 6, 8, 10 includes a horizontal sweep signal generating section 23 having a counter 20 and a D-type flip flop 22. The horizontal sweep generator also includes a multiplexer 24. The horizontal sweep signal generating section 23 generates horizontal sweep signals as shown in FIG. 4 and the multiplexer 24 selects a signal from the horizontal sweep signal generated from the horizontal sweep signal generating section 23 or an original inputted video signal based on a selecting signal SEL. A clock signal CLK is applied to a clock stage of the D-type flip flop 22 in the horizontal sweep signal generating section 23 and a horizonal synchronous signal Hsync is applied to a clear stage thereof. The output of the D-type flip flop 22 is connected to an input stage 1 of the multiplexer 24 and is also input to the counter 20. The counter 20 counts up by 1 when it receives the output from the D-type flip flop 22 and feeds back the results to an input stage D of the D-type flip flop 22.

In FIG. 3, the vertical sweep signal generator disposed at the input end of each of the plurality of DSP ICs 6, 8, 10 includes a vertical sweep signal generating section 33 having a counter 30 and a D-type flip flop 32. The vertical sweep generator also includes a multiplexer 34. The vertical sweep signal generating section 33 generates vertical sweep signals as shown in FIG. 5, and the multiplexer 34 selects a signal from the vertical sweep signal generated from the vertical sweep signal generating section 33 or an original input video signal based on a selecting signal SEL. A clock signal CLK is applied to a clock stage of the D-type flip flop 32 in the vertical sweep signal generating section 33 and a vertical synchronous signal Vsync applied to a clear stage thereof. The output of the D-type flip flop 32 is connected to an input stage 1 of the multiplexer 34 and is also connected to the counter 30. The counter 30 is activated by the horizontal synchronous signal Hsync, counts up by 1 to the output from the D-type flip flop 32 and feeds back the results to an input stage D of the D-type flip flop 32.

First, the generation of a horizontal sweep signal according to an embodiment of the present invention will be described with reference to FIG. 2 and FIG. 4. For a typical video signal, there are 910 dots on 1 horizontal line and the luminance level of a pixel on a screen can be represented up to 256 steps. As a result, the horizontal sweep signal generating section 23 in FIG. 2 may be embodied in 8 bits. To represent a luminance level of a pixel in connection with a horizontal sweep signal on 1 horizontal line a horizontal sweep signal waveform of 3.5 periods (=910÷256) is generated. In order to generate the horizontal sweep signal waveform of 1 period, it is preferable to implement the horizontal sweep signal generating section 23 in FIG. 2 in a 10 bit structure.

The output of the D-type flip flop 22 in the horizontal sweep signal generating section 23 in FIG. 2 is reset by the horizontal synchronous signal Hsync input to. a clear stage CLR thereof and is operated by the clock signal CLK so that it can latch and output the signal "0" input to an input stage D. The output of the D-type flip flop 22 is applied to both an input stage 1 of the multiplexer 24 and the counter 20. The counter 20 counts up "1" when it receives the output from the D-type flip flop 22 and feeds back the results to an input stage D of the D-type flip flop 22, so that the output of the D-type flip flop 22, or the output of the horizontal sweep signal generating section 23 increases gradually such as "0, 1, 2, 3, . . . , 253, 254, 255". When the output of the D-type flip flop 22 becomes "256", a carry is generated, simultaneously the remaining values become "0". The carry is thrown away and the remaining values are maintained so that the output of the D-type flip flop 22 will become "0". The counter 20 counts up "1" when it receives the output from the D-type flip flop 22 and feeds back again the results to the input stage D of the D-type flip flop 22. The counting up and resetting of the D flip-flop continues until 910 dots of 1 horizontal line are output. When the horizontal sweep signal generating section 23 operates in such a manner, the horizontal sweep signal of a sawtooth waveform as shown in FIG. 4(*b*) will be generated. If the horizontal synchronous signal Hsync is applied to the end part of 1 horizontal line, the D-type flip flop 22 will reset. FIG. 4(*a*) illustrates a horizontal line output when the horizontal sweep generating circuit is implemented using 10 bits.

Next, the generation of a vertical sweep signal according to an embodiment of the present invention will be described with reference to FIG. 3 and FIG. 5.

The output of the D-type flip flop 32 in the vertical sweep signal generating section 33 in FIG. 3 is reset by the vertical synchronous signal Vsync input to a clear stage CLR thereof and is operated by the clock signal CLK so that it can latch and output the signal "0" input to an input stage D. The output of the D-type flip flop 32 is applied to both an input stage 1 of the multiplexer 34 and the counter 30. When the horizontal synchronous signal Hsync is not applied to the counter 30, the counter 30 merely feeds back the output of the D-type flip flop 32 to an input stage D thereof. On the other hand, when the horizontal synchronous signal Hsync is applied to the counter 30, the counter 30 counts up "1" when it receives the output from the D-type flip flop 32 and feeds back the results to an input stage D of the D-type flip flop 32, so that the output of the D-type flip flop 32 will increase gradually every time a horizontal line increases. If the vertical synchronous signal Vsync is applied to the end part of 1 vertical line, the D-type flip flop 32 will reset. FIG. 5(*a*) is a wave form chart showing a vertical sweep signal and FIG. 5(*b*) is a wave form chart showing a vertical sweep signal viewed with respect to Hsync.

A test operation for checking the operating state of the DSP ICs 6,8,10 in FIG. 1 including the horizontal sweep signal generator in FIG. 2 and the vertical sweep signal generator in FIG. 3 and the connecting state of these ICs will be described hereinafter.

To make the test, one should connect a monitor, e.g. an oscilloscope or a television monitor, to an output line of DSP IC 10 via a DAC disposed at the rear stage of DSP ICs 6, 8, 10, and then check from DSP IC 10 at the rear state of the cascade to DSP IC 6 at the front stage of the cascade order. More particularly, a selecting signal SEL="1" is applied to DSP IC 10 and a selecting signal SEL="0" is applied to DSP IC 6,8. Accordingly, the multiplexers 24, 34 of horizontal and vertical sweep signal generators in DSP IC 6,8 select an input stage "0" but the multiplexers 24, 34 of horizontal and vertical sweep signal generators in DSP IC 10 select an input stage "1". The horizontal and vertical sweep signal generators in DSP IC 10, each selecting an input stage "1" of the multiplexers 24,34, generate the horizontal and vertical sweep signals, and the DSP processes the sweep signals based on its intrinsic operation. If the output of DSP IC 10 turns out to be the horizontal and vertical sweep signals as shown in FIG. 4 and FIG. 5, as shown by a monitor connected to an output line of the DSP IC 10, the DSP IC 10 can be regarded as a regularly operating chip. But if not, the DSP IC 10 can be regarded as a defective chip.

If the DSP IC 10 is found to be in the normal state, a tester applies a selecting signal SEL="1" to the DSP IC 8 at the front stage and a selecting signal SEL="0" is applied to the remaining DSP ICs 6,10. As a result, the sweep signals are generated from the sweep signal generators in the DSP IC 8 only. In this case, if the output of DSP IC 8 turns to be the horizontal and vertical sweep signals as shown in FIG. 4 and FIG. 5 as shown by a monitor connected to an output line of the DSP IC 10, the DSP IC 8 can be regarded as a regularly operating chip. But if not, the DSP IC 8 can be regarded as a defective chip.

The foregoing method provides a way to check in a simple way the operating state of each of the ICs while connected with a plurality of DSP ICs 6,8,10 as well as the production and assembly state of PCB when manufacturing of the products is finished. Thus, in the present invention as described above, it is possible to check simply the operating state of each of the ICs while connected to other DSP ICs as well as the production and assembly state of the PCB when the assembly of the digital signal processor products is finished. Furthermore, it is possible to check for damage of the parts incurred while connecting ICs in the lines on a PCB, manufacturing the products, or shipping the completed products.

While there have been illustrated and described what are considered to be preferred embodiments of the present invention, it will be understood by those skilled in the art that various changes and modifications and equivalents may be substituted for elements described above without departing from the spirit and scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. A test device for individually testing one or more digital signal processor integrated circuits which each include a test signal generator, said integrated circuits being integrated with one or more additional integrated circuits in a product state in a digital video apparatus, the test device comprising:

a plurality of said digital signal processor integrated circuits, each responsive to a mode selection signal for digitally processing a signal from said test signal generator and outputting the digitally processed signal when a respective one of said plurality of integrated circuits is selected by the mode selection signal;

a monitor for monitoring an output from the selected DSP IC being tested.

2. The test device according to claim 1, wherein the test signal generator comprises a sweep signal generator for generating sweep signals indicative of levels from a black level pixel to a white level pixel.

3. The test device according to claim 2, wherein the sweep signal generator comprises a horizontal sweep signal generator for generating a sweep signal in a horizontal line and a vertical sweep signal generator for generating a sweep signal in a vertical line.

4. The test device according to claim 3, wherein the horizontal sweep signal generator comprises a D-type flip flop cleared by a horizontal synchronous signal and operated by a clock signal, a counter for counting up by a predetermined value when the counter receives an output from the D-type flip flop and applying the count result to an input of said D-type flip flop, and a selecting means for selecting an output from the D-type flip flop or an original video signal as an output based on said mode selection signal for test control.

5. The test device according to claim 3, wherein the vertical sweep signal generator comprises a D-type flip flop cleared by a vertical synchronous signal and operated by a clock signal, a counter, which activated by a horizontal sync signal, for counting up by a predetermined value when the counter receives an output from the D-type flip flop and applying the count result to an input stage of the D-type flip-flop, and a selecting means for selecting an output from the D-type flip flop or an original video signal as an output based on said mode selection signal for test control.

6. The test device according to claim 5, wherein when said counter does not receive the horizontal sync signal, the output of said D-type flip flop is fed back to the input said D-type flip flop.

7. A method for testing a plurality of digital signal processor integrated circuits (DSP ICs) coupled to at least one other digital signal processor integrated circuit, each of said integrated circuits including a test signal generator, in a cascade type arrangement, said method comprising the steps of:

(a) generating sweep signals indicative of levels from a black level pixel to a white level pixel in each of a said plurality of DSP ICs;

(b) controlling a selected DSP IC to be tested from said plurality of DSP ICs to have only the selected DSP IC use the sweep signals for DSP processing and controlling non-selected DSP ICs to have the DSP ICs select an original video signal; and (c) monitoring the results output from the selected DSP IC at an output stage of the plurality of DSP ICs.

8. The method according to claim 7, wherein the sweep signals comprise a horizontal line sweep signal generated by a horizontal sweep signal generator and a vertical line sweep signal generated by a vertical sweep signal generator.

9. The method according to claim 8, wherein the horizontal sweep signal generator comprises a D-type flip flop cleared by a horizontal synchronous signal and operated by a clock signal, a counter for counting up by a predetermined value when the counter receives an output from the D-type flip flop and applying the count result to an input stage of the D-type flip flop, and a selecting means for selecting an output from one of the D-type flip flop and the original video signal based on a selecting signal for test control generated during said controlling step (b).

10. The method according to claim 8, wherein the vertical sweep signal generator comprises a D-type flip flop cleared by a vertical synchronous signal and operated by a clock signal, a counter, which is activated by a horizontal sync signal for counting up by a predetermined value when the counter receives an output from the D-type flip flop and applying the count result to an input stage of the D-type flip flop, and a selecting means for selecting an output from one of the D-type flip flop and the original video signal based on a selecting signal for test control generated during said controlling step (b).

11. The method according to claim 10, wherein when said counter does not receive the horizontal sync signal, the output of said D-type flip flop is fed back to the input said D-type flip flop.

* * * * *